(12) United States Patent
Bao et al.

(10) Patent No.: US 12,108,272 B2
(45) Date of Patent: Oct. 1, 2024

(54) REPORTING METHOD, CONFIGURATION METHOD, TERMINAL, AND NETWORK DEVICE

(71) Applicant: VIVO MOBILE COMMUNICATION CO., LTD., Guangdong (CN)

(72) Inventors: Wei Bao, Chang'an Dongguan (CN); Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 406 days.

(21) Appl. No.: 17/488,149

(22) Filed: Sep. 28, 2021

(65) Prior Publication Data

US 2022/0022081 A1 Jan. 20, 2022

Related U.S. Application Data

(63) Continuation of application No. PCT/CN2020/079891, filed on Mar. 18, 2020.

(30) Foreign Application Priority Data

Mar. 29, 2019 (CN) .......................... 201910253158.2

(51) Int. Cl.
*H04W 24/10* (2009.01)
*H04W 60/04* (2009.01)
*H04W 76/10* (2018.01)

(52) U.S. Cl.
CPC .......... *H04W 24/10* (2013.01); *H04W 60/04* (2013.01); *H04W 76/10* (2018.02)

(58) Field of Classification Search
CPC ...... H04W 24/10; H04W 76/10; H04W 60/04
USPC .......................................................... 370/329
See application file for complete search history.

(56) References Cited

U.S. PATENT DOCUMENTS

2012/0295650 A1 11/2012 Futaki et al.
2018/0041953 A1 2/2018 Lindoff et al.

FOREIGN PATENT DOCUMENTS

| CN | 105873099 A | 8/2016 | |
|---|---|---|---|
| WO | 2011083801 A1 | 7/2011 | |
| WO | 2016045319 A1 | 3/2016 | |
| WO | WO-2018156696 A1 * | 8/2018 | ........ H04W 36/0072 |
| WO | WO-2020167205 A1 * | 8/2020 | ........ H04W 12/0431 |

OTHER PUBLICATIONS

R2-1901612 (Year: 2019).*
R2-1806772 (Year: 2018).*
R2-1900104 (Year: 2019).*
R2-1900104, "Supporting early measurement reporting in NR", 3GPP TSG RAN WG2 Meeting #105, source "Qualcomm Incorporated" (Year: 2019).*

(Continued)

*Primary Examiner* — Intekhaab A Siddiquee
(74) *Attorney, Agent, or Firm* — Price Heneveld, LLP (57) ABSTRACT

Embodiments of this disclosure provide a reporting method, a configuration method, a terminal, and a network device. The reporting method includes: reporting assistance information to a network device, where the assistance information is used by a network to configure early measurement reporting for the terminal.

14 Claims, 6 Drawing Sheets

(56) References Cited

OTHER PUBLICATIONS

Japanese Office Action dated Feb. 14, 2023 as received in application No. 2021-557709.
Chinese Office Action dated Dec. 13, 2021 as received in application No. 201910253158.2.
"Summarey of UE power Consumption Reduction in RRM Measurements" 3GPP TSG RAN WG1 Meeting #95, R1-1814286, Nov. 12, 2018. VIVO.
Indian Office Action dated Mar. 11, 2022 as received in application No. 202127047178.
International Search Report and Written Opinion dated Jun. 22, 2020 as received in application No. PCT/CN2020079891.
"Discussion on Validity Timer and Area for euCA Measurement" 3GPP TSG-RAN WG2#101bis, R2-1804529, Sanya, China, Apr. 16, 2018, VIVO.
"Validity timer for early measurement " 3GPP TSG-RAN WG2 Meeting#101bis R2-1804682 Sanya, China, Apr. 16-20, 2018, VIVO.
EP Search Report in Application No. 20782793.2 dated Mar. 24, 2022.
"Finalizing IDLE mode measurements for euCA" 3GPP TSG-RAN WG2 Meeting #102, R2-1806772, Nokia, Nokia Shanghai Bell, May 21, 2018.
"Early measurement configuration/reporting in LTE and NR RRC_IDLE" 3GPP TSG-RAN WG2 Meeting#105, R2-1901612, Huawei, HISilicon, Feb. 25, 2019.
"Signaling of early measurements for CA/DC setup" 3GPP TSG-RAN WG2 #105, R2-1900693, Ericsson, Feb. 25, 2019.
"Supporting early measurement reporting in NR" 3GPP TSG RAN WG2 Meeting #105, R2-1900104, Qualcomm Incorporated, Feb. 25, 2019.

* cited by examiner

Report assistance information to a network device, where the assistance information is used by the network to configure early measurement reporting for a terminal — 301

Obtain assistance information from a terminal, where the assistance information is used by a network to configure early measurement reporting for the terminal — 501

REPORTING METHOD, CONFIGURATION METHOD, TERMINAL, AND NETWORK DEVICE

CROSS-REFERENCE TO RELATED APPLICATIONS

This application is a continuation of PCT Application No. PCT/CN2020/079891 filed on Mar. 18, 2020, which claims priority to Chinese Patent Application No. 201910253158.2, filed in China on Mar. 29, 2019, which is incorporated herein by reference in its entirety.

TECHNICAL FIELD

This disclosure relates to the field of communication technologies, and in particular, to a reporting method, a configuration method, a terminal, and a network device.

BACKGROUND

It is well known that carrier aggregation (CA) applies where multiple serving cells configured by a network for one terminal (User Equipment, UE) belong to a same base station. CA means that one terminal uses spectrum resources of multiple serving cells simultaneously for data transmission to increase a data reception and transmission throughput of the terminal. A technology similar to CA is dual connectivity (DC). DC applies where multiple serving cells configured by a network for one UE belong to two base stations.

A serving cell of a terminal is configured by a network (NW). Generally, the network selects, based on measurement results of neighboring cells reported by the terminal, a cell whose signal quality meets a given condition, and configures it as a serving cell of the terminal. The network configures: neighboring cell parameters for measurement by the terminal (for example, to-be-measured frequency channels and measurement quantities, where the measurement quantities may include reference signal received power (RSRP) and/or reference signal received quality (RSRQ)) and reporting configurations (report trigger condition, to-be-reported measurement quantities, and the like). Configuration and reporting of measurement can be performed only after security is activated. Consequently, the UE needs to experience a long delay before CA can be configured for it.

To reduce the delay, an early measurement reporting technology is introduced to LTE: based on a network configuration (which includes a to-be-measured frequency channel, a validity timer, a validity area), a terminal in a non-connected state measures a to-be-measured frequency channel in a configured time period and area; and reports a measurement result to a network when the terminal is entering or has entered a connected state. This solution can effectively reduce a delay from when the UE enters the connected state to when the UE can start to use CA/DC (a secondary cell) for transmission). A specific CA or DC configuration procedure is shown in FIG. 1.

Figure 1:
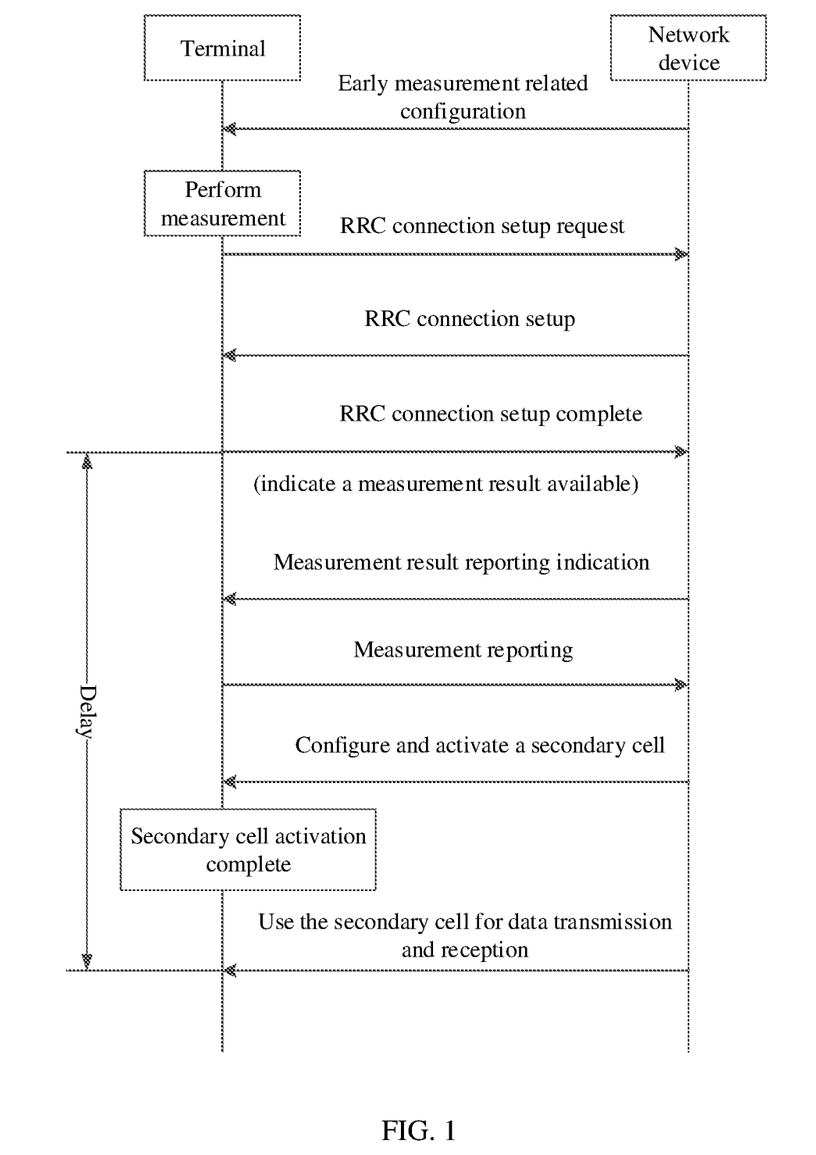
FIG. 1 is a flow chart of CA or DC configuration in the related art.

As shown in FIG. 1, in the early measurement reporting solution in the related art, whether to configure early measurement reporting, a configured to-be-measured frequency channel, a validity timer, and a validity area are all determined by an NW. As a result, the early measurement reporting configured by the network is much likely to mismatch a requirement of the terminal, resulting in undesirable early measurement reporting.

SUMMARY

Embodiments of this disclosure provide a reporting method, a configuration method, a terminal, and a network device, so as to resolve the problem of undesirable early measurement reporting caused by a mismatch between the early measurement reporting configured by a network and a requirement of a terminal.

According to a first aspect, an embodiment of this disclosure provides a reporting method applied to a terminal, where the method includes:
 reporting assistance information to a network device, where the assistance information is used by a network to configure early measurement reporting for the terminal.

According to a second aspect, an embodiment of this disclosure further provides a configuration method, applied to a network device and including:
 obtaining assistance information from a terminal, where the assistance information is used by a network to configure early measurement reporting for the terminal.

According to a third aspect, an embodiment of this disclosure further provides a terminal, including:
 a first transmitting module, configured to report assistance information to a network device, where the assistance information is used by a network to configure early measurement reporting for the terminal.

According to a fourth aspect, an embodiment of this disclosure further provides a network device, including:
 an obtaining module, configured to obtain assistance information from a terminal, where the assistance information is used by a network to configure early measurement reporting for the terminal.

According to a fifth aspect, an embodiment of this disclosure further provides a terminal, including a memory, a processor, and a program stored in the memory and capable of running on the processor, where when the program is executed by the processor, the steps of the foregoing reporting method are implemented.

According to a sixth aspect, an embodiment of this disclosure further provides a network device, including a memory, a processor, and a program stored in the memory and capable of running on the processor, where when the program is executed by the processor, the steps of the foregoing configuration method are implemented.

According to a seventh aspect, an embodiment of this disclosure further provides a computer-readable storage medium, where the computer-readable storage medium stores a computer program, and when the computer program is executed by a processor, the steps of the reporting method on the terminal side are implemented, or when the computer program is executed by a processor, the steps of the configuration method on the network device side are implemented.

In the embodiments of this disclosure, the terminal reports the assistance information, so that the network device can configure the early measurement reporting for the terminal based on the assistance information. In this way, the terminal participates in the configuration of the early measurement reporting, thereby avoiding the problem of undesirable early measurement reporting caused by a mismatch between the early measurement reporting configured by the network and a requirement of the terminal.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments obtained by persons of ordinary skill in the art without creative efforts based on the embodiments of this disclosure shall fall within the protection scope of this disclosure.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted as being more preferred or advantageous than other embodiments or design solutions. Specifically, the terms such as "an example" or "for example" are used to present related concepts in a specific manner.

The following describes the embodiments of this disclosure with reference to the accompanying drawings. A reporting method, a terminal, and a network device that are provided by the embodiments of this disclosure may be applied in a wireless communications system. The wireless communications system may be a 5G system, or an evolved long term evolution (eLTE) system, or a later evolved communications system.

Figure 2:
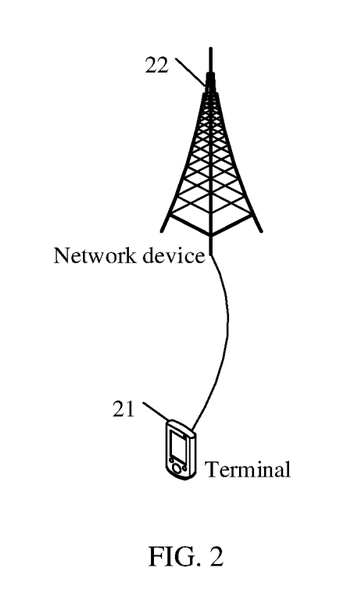
FIG. 2 is a structural diagram of a network system to which an embodiment of this disclosure may be applied.

Referring to FIG. 2, FIG. 2 is a structural diagram of a network system to which an embodiment of this disclosure may be applied. As shown in FIG. 2, the network system includes a terminal 21 and a network device 22. The terminal 21 may be a user terminal or other terminal side devices, for example, a terminal side device such as a mobile phone, a tablet personal computer, a laptop computer, a personal digital assistant (PDA), a mobile Internet device (MID), or a wearable device. It should be noted that a specific type of the terminal 21 is not limited in this embodiment of this disclosure. The network device 22 may be a fifth generation (5G) base station, a base station of a later version, or a base station in other communications systems, or may be referred to as a NodeB, an evolved NodeB, a transmission reception point (TRP), an access point (AP), or other terms in the field. Provided that the same technical effects are achieved, the network device is not limited to any particular technical term. In addition, the network device 22 may be a master node (MN) or a secondary node (SN). It should be noted that in this embodiment of this disclosure, the 5G base station is used as only an example, and the network device is not limited to any specific type.

Figure 3:
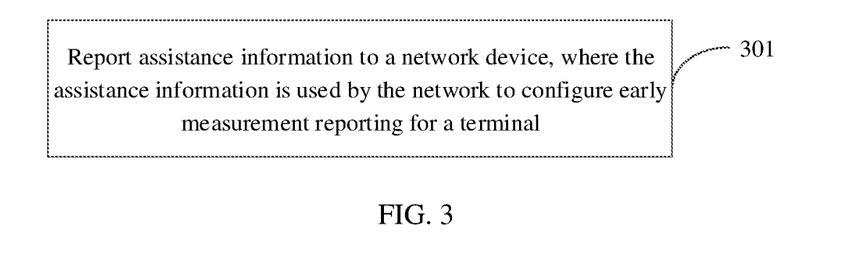
FIG. 3 is a flowchart of a reporting method according to an embodiment of this disclosure.

Referring to FIG. 3, FIG. 3 is a flowchart of a reporting method according to an embodiment of this disclosure. The method is applied to a terminal, and as shown in FIG. 3, includes the following step:

Step 301. Report assistance information to a network device, where the assistance information is used by a network to configure early measurement reporting for the terminal.

In this embodiment of this disclosure, the terminal may report the assistance information to the currently accessed network device after or when entering a connected state (for example, after an RRC setup complete message or an RRC resume complete message).

That the assistance information is used by a network to configure early measurement reporting for the terminal can be understood as follows: the assistance information is used by a target network node in the network to configure early measurement for the terminal. Specifically, the target network node may be the network device to which the terminal reports the assistance information, or a handed-over-to target network device during handover of the network device, or a network device selected by the terminal for a current service when the terminal switches from an inactive state back to the connected state.

Specifically, UE enters the connected state when served by a network device 1 and reports the assistance information; then switches from the network device 1 to a network device 2, and then switches to a network device 3. After completing a service on the network device 3, the UE enters an idle state or inactive state. In this process, the assistance information reported by the UE is transmitted by the network device 1 to the network device 2, and then from the network device 2 to the network device 3. Finally, the network device 3 can configure early measurement reporting for the terminal based on the assistance information, when the UE enters the idle state or inactive state (for example, in an RRC release or RRC connection release complete (RRC Connection Release) message).

It should be noted that the network device may first determine, based on the assistance information, whether to perform early measurement reporting configuration on the terminal. If determining that the terminal needs to perform early measurement reporting, the network device may transmit the early measurement reporting configuration to the terminal based on the assistance information; and if determining that the terminal does not need to perform the early measurement reporting, the network device does not transmit the early measurement reporting configuration to the terminal.

Further, in an embodiment, after the terminal reports the assistance information to the network device, the network device stores the assistance information in context (UE Context) information of the terminal. During handover for the terminal, context information of a terminal in a connected state is transmitted between a source service network device and a handed-over-to target network device. Specifically, the source service network device may transmit the context information of the terminal to the target network device, so that the target network device has the assistance information of the terminal, and can determine, based on the assistance information, that the terminal needs to perform the early measurement reporting. It should be understood that after the terminal is handed over to the target network device, the terminal may further report the assistance information to the target network device. When assistance information obtained by the target network device includes the assistance information in the context information and the assistance information reported by the terminal, the assistance information reported by the terminal is used to configure the terminal to perform the early measurement reporting. For example, the assistance information in the context information may be updated to the assistance information reported by the terminal.

In another embodiment, the UE in the connected state enters an inactive state after receiving an indication for entering the inactive state, and the last serving network device of the terminal also retains the UE context information.

When the UE selects a current serving network device thereafter for connection resumption, the current serving network device needs to retrieve the UE context from the last serving network device. In the resume procedure, inactive-state context information is transmitted between the current serving network device and the last serving network device. Specifically, the UE may not report the assistance information. Instead, the last serving network device stores the assistance information in the UE context and transmits it to the current serving network device. Thereafter, the terminal may alternatively report the assistance information to the current serving network device. In this way, when assistance information obtained by the current serving network device includes the assistance information in the context information and the assistance information reported by the terminal, the assistance information reported by the terminal is used to configure the terminal to perform the early measurement reporting. For example, the assistance information in the context information may be updated to the assistance information reported by the terminal.

Figure 4:
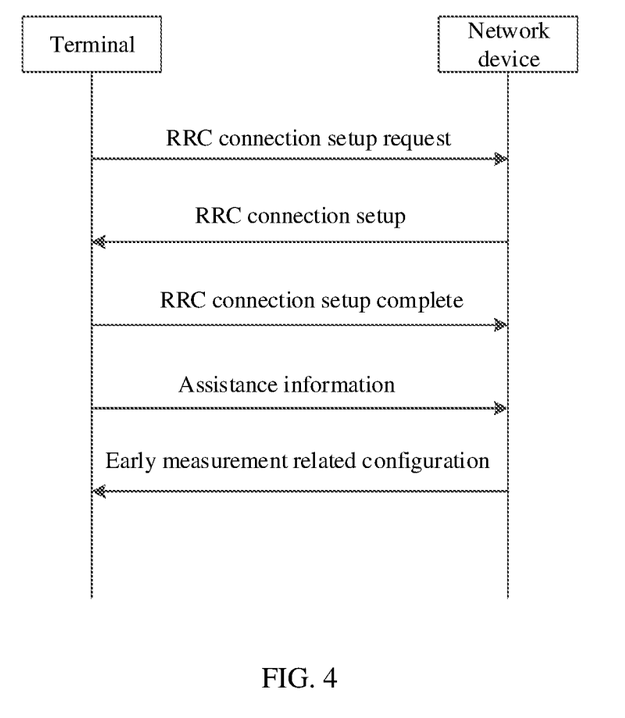
FIG. 4 is a flowchart of configuring early measurement based on assistance information in a reporting method according to an embodiment of this disclosure.

Reporting of the assistance information is added in this embodiment of this disclosure. A specific process for configuring the early measurement reporting based on the assistance information is shown in FIG. 4. Specifically, a process for reporting the assistance information by the terminal may include at least one of the following:

reporting in an RRC connection setup request process (for example, reporting in an RRC connection setup request message, or reporting in an RRC connection setup complete message);

reporting in an RRC connection resume (RRC resume) procedure (for example, reporting in an RRC connection resume request message, or reporting in an RRC connection resume complete message);

reporting in an RRC connection re-establishment (RRC Re-establishment) procedure (for example, reporting in an RRC connection re-establishment request message, or reporting in an RRC connection re-establishment complete message); or reporting after the terminal enters a connected state.

In this embodiment of this disclosure, the terminal reports the assistance information, so that the network device can configure the early measurement reporting for the terminal based on the assistance information. In this way, the terminal participates in the configuration of the early measurement reporting, thereby avoiding the problem of undesirable early measurement reporting caused by a mismatch between the early measurement reporting configured by the network and a requirement of the terminal.

It should be noted that specific content of the assistance information may be set based on an actual need. For example, in this embodiment, the assistance information may include: information that no early measurement needs to be configured. Alternatively, the assistance information includes at least one of the following:

information that early measurement needs to be configured;

information about to-be-measured frequency channel;

information about validity timer; or information about validity area.

The information about validity area includes at least one of a tracking area list (TA list), a cell list, or a radio access network-based notification area list (RNA list).

It should be understood that when the assistance information includes information that no early measurement needs to be configured, the assistance information may not include the remaining content. When it is determined that the terminal needs to perform the early measurement reporting, the assistance information may include one or more of information that early measurement needs to be configured, information about to-be-measured frequency channel, information about validity timer, and information about validity area. When the assistance information includes information about to-be-measured frequency channel, information about validity timer, and information about validity area, the network may determine specific content of the early measurement reporting configuration of the terminal based on the information about to-be-measured frequency channel, information about validity timer, and information about validity area.

Further, in this embodiment of this disclosure, the terminal may determine the assistance information based on at least one of information such as historical behavior and a terminal status. Specifically, before step 301, the method further includes:

determining the assistance information based on at least one of a terminal status, a carrier aggregation CA use history, or a dual connectivity DC use history.

Specifically, the UE may find a pattern of regular behavior of the UE based on the historical behavior, for example, a regular geographical location for using the CA technology, a preferred moving speed for using DC, and so on. In this solution, it is recommended that the UE reports the assistance information to the NW, for example, information such as whether high-throughput services are frequently used, a mobility status of the UE, and duration for early measurement. In this way, to-be-reported assistance information is generated based on the use status of CA and DC, and reported to the NW to assist the NW in the early measurement reporting configuration. In this way, the early measurement reporting configured by the network can better meet a requirement of the terminal.

In an optional embodiment, the terminal status may include terminal battery information. In this embodiment, the early measurement reporting increases power consumption of the UE. Therefore, if the UE is at a low battery, the UE can indicate to the NW through assistance information that no early measurement reporting configuration is needed.

It should be noted that when the network device determines that the terminal needs to perform early measurement reporting, after the reporting assistance information to a network device, the method further includes:
receiving an early measurement reporting configuration from the network.

Specifically, the early measurement reporting configuration may be carried in dedicated signaling or a system broadcast message.

For example, the NW may transmit the early measurement reporting configuration in a radio resource control (RRC) connection release or RRC release message when the UE leaves the connected state (enters the idle state (IDLE) or inactive state (Inactive) from the connected state (Connected)). Alternatively, the NW broadcasts the early measurement reporting configuration in a system message, so that the terminal receives the early measurement reporting configuration before leaving the connected state.

To help better understand this disclosure, a specific implementation process of this disclosure is described in detail below by using a plurality of different implementation solutions.

Solution 1: The UE reports that early measurement configuration is not needed.

Step 1. The UE finds, based on the CA and/or DC use history, that the probability of using CA and/or DC is low.

Step 2. After entering the connected state, the UE reports to the NW that no early measurement configuration is needed, so as to reduce power consumption.

Step 3. When the NW releases or suspends an RRC connection for the UE, dedicated signaling (for example, an RRC Release message) does not carry an early measurement related configuration.

Solution 2: The UE reports that early measurement configuration is needed.

Step 1. The UE finds, based on the CA and/or DC use history, that the probability of using CA and/or DC is high.

Step 2. After entering the connected state, the UE reports to the NW that early measurement configuration is needed, so as to reduce a delay for configuring CA and/or DC.

Step 3. When the NW releases or suspends an RRC connection for the UE, dedicated signaling (for example, an RRC Release message) carries an early measurement related configuration.

Solution 3: The UE reports duration for early measurement.

Step 1. The UE finds, based on the CA and/or DC use history, that after the UE enters the idle and/or inactive state, the probability of using CA and/or DC is high within 10 minutes.

Step 2. After entering the connected state, the UE reports to the NW that early measurement may last for 10 minutes.

Step 3. When the NW releases or suspends an RRC connection for the UE, dedicated signaling (for example, an RRC Release message) carries an early measurement related configuration, for example, setting a validity timer to 10 minutes.

Solution 4: The UE reports an area for early measurement.

Step 1. The UE finds, based on the CA and/or DC use history, that after the UE enters the idle and/or inactive state, the probability of using CA and/or DC is high in a neighbor area (for example, a residential area in a work-off time period).

Step 2. After entering the connected state, the UE reports to the NW that early measurement may be performed in an area (which is indicated through, for example, a cell list).

Step 3. When the NW releases or suspends an RRC connection for the UE, dedicated signaling (for example, an RRC Release message) carries an early measurement related configuration, for example, the validity area may include some or all areas reported by the terminal in step 2.

Solution 5: The UE reports a frequency channel for early measurement.

Step 1. The UE finds, based on the CA and/or DC use history, that the probability of using a particular frequency channel for CA and/or DC is high.

Step 2. After entering the connected state, the UE reports to the NW that early measurement may be performed in the particular frequency channel (for example, a reported frequency channel or carrier list).

Step 3. When the NW releases or suspends an RRC connection for the UE, dedicated signaling (for example, an RRC Release message) carries an early measurement related configuration, for example, the to-be-measured frequency channel list may include some or all frequency channels reported by the terminal in step 2.

Figure 5:
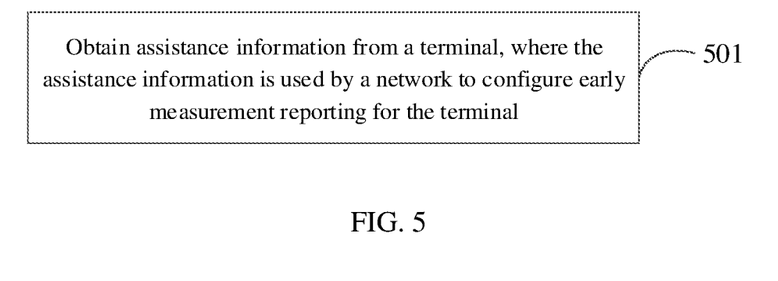
FIG. 5 is a flowchart of a configuration method according to an embodiment of this disclosure.

Referring to FIG. 5, FIG. 5 is a flowchart of a configuration method according to an embodiment of this disclosure. The method is applied to a network device, and as shown in FIG. 5, includes the following step:

Step 501. Obtain assistance information from a terminal, where the assistance information is used by a network to configure early measurement reporting for the terminal.

Optionally, the obtaining assistance information from a terminal includes: receiving the assistance information from the terminal.

Optionally, the obtaining assistance information from a terminal includes:
receiving first context information from a source service network device of the terminal in a handover procedure of the terminal, where the first context information is context information of the terminal being in a connected state and includes the assistance information of the terminal; or
receiving second context information from a target network device, where the second context information is inactive-state context information and includes the assistance information of the terminal, and when receiving a context information obtaining request from the network device, the target network device transmits the second context information to the network device.

When the obtained assistance information includes first assistance information and second assistance information, the second assistance information is updated to the first assistance information.

The first assistance information is assistance information reported by the terminal, and the second assistance information is assistance information in the first context information or assistance information in the second context information. Optionally, if the obtaining assistance information from a terminal is receiving the assistance information reported by the terminal, the method further includes:
storing the assistance information reported by the terminal in context information of the terminal.

Optionally, the assistance information includes: information that no early measurement needs to be configured.

Optionally, the assistance information includes at least one of the following:
information that early measurement needs to be configured;
information about to-be-measured frequency channel;
information about validity timer; or
information about validity area.

Optionally, the information about validity area includes at least one of a tracking area, TA, list, a cell list, or a radio access network-based notification area, RNA, list.

Optionally, before the obtaining assistance information from a terminal, the method further includes:

transmitting an early measurement reporting configuration to the terminal.

Optionally, the early measurement reporting configuration is carried in dedicated signaling or a system broadcast message.

It should be noted that this embodiment is an embodiment of the network device corresponding to the embodiment shown in FIG. 3. For specific implementation of this embodiment, reference may be made to the relevant descriptions about the embodiment shown in FIG. 3, and the same beneficial effect is achieved. To avoid repetition, details are not described herein again.

Figure 6:
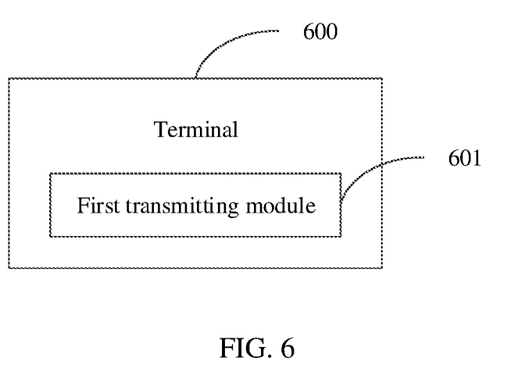
FIG. 6 is a structural diagram of a terminal according to an embodiment of this disclosure.

Referring to FIG. 6, FIG. 6 is a structural diagram of a terminal according to an embodiment of this disclosure. As shown in FIG. 6, the terminal 600 includes:

a first transmitting module 601, configured to report assistance information to a network device, where the assistance information is used by a network to configure early measurement reporting for the terminal.

Optionally, the assistance information includes: information that no early measurement needs to be configured.

Optionally, the assistance information includes at least one of the following:

information that early measurement needs to be configured;

information about to-be-measured frequency channel;

information about validity timer; or information about validity area.

Optionally, the information about validity area includes at least one of a tracking area, TA, list, a cell list, or a radio access network-based notification area, RNA, list.

Optionally, the terminal 600 further includes:

a receiving module, configured to receive an early measurement reporting configuration from the network.

Optionally, the early measurement reporting configuration is carried in dedicated signaling or a system broadcast message.

Optionally, the terminal 600 further includes:

a determining module, configured to determine the assistance information based on at least one of a terminal status, a carrier aggregation CA use history, or a dual connectivity DC use history.

Optionally, where the terminal status includes terminal battery information.

The terminal provided by this embodiment of this disclosure can implement the processes implemented by the terminal in the method embodiment in FIG. 3. To avoid repetition, details are not described herein again.

Figure 7:
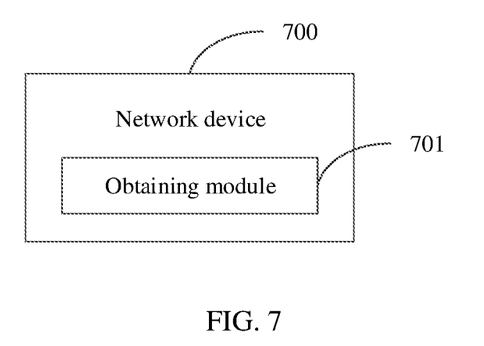
FIG. 7 is a structural diagram of a network device according to an embodiment of this disclosure.

Referring to FIG. 7, FIG. 7 is a structural diagram of a network device according to an embodiment of this disclosure. As shown in FIG. 7, the network device 700 includes:

an obtaining module 701, configured to obtain assistance information from a terminal, where the assistance information is used by a network to configure early measurement reporting for the terminal.

Optionally, the obtaining module is specifically configured to receive the obtaining assistance information from the terminal.

Optionally, the obtaining module is specifically configured to:

receive first context information from a source service network device of the terminal in a handover procedure of the terminal, where the first context information is context information of the terminal being in a connected state and includes the assistance information of the terminal; or receive second context information from a target network device, where the second context information is inactive-state context information and includes the assistance information of the terminal, and when receiving a context information obtaining request from the network device, the target network device transmits the second context information to the network device.

Optionally, the network device 700 further includes an update module, configured to: when the obtained assistance information includes first assistance information and second assistance information, update the second assistance information to the first assistance information, where the first assistance information is assistance information reported by the terminal, and the second assistance information is assistance information in the first context information or assistance information in the second context information.

Optionally, the network device 700 further includes:

a storage module, configured to store the assistance information reported by the terminal in context information of the terminal.

Optionally, the assistance information includes: information that no early measurement needs to be configured.

Optionally, the assistance information includes at least one of the following:

information that early measurement needs to be configured;

information about to-be-measured frequency channel;

information about validity timer; or information about validity area.

Optionally, the information about validity area includes at least one of a tracking area, TA, list, a cell list, or a radio access network-based notification area, RNA, list.

Optionally, the network device 700 further includes:

a second transmitting module, configured to transmit an early measurement reporting configuration to the terminal.

Optionally, the early measurement reporting configuration is carried in dedicated signaling or a system broadcast message.

The network device provided in this embodiment of this disclosure can implement the processes implemented by the network device in the method embodiment in FIG. 5. To avoid repetition, details are not described herein again.

Figure 8:
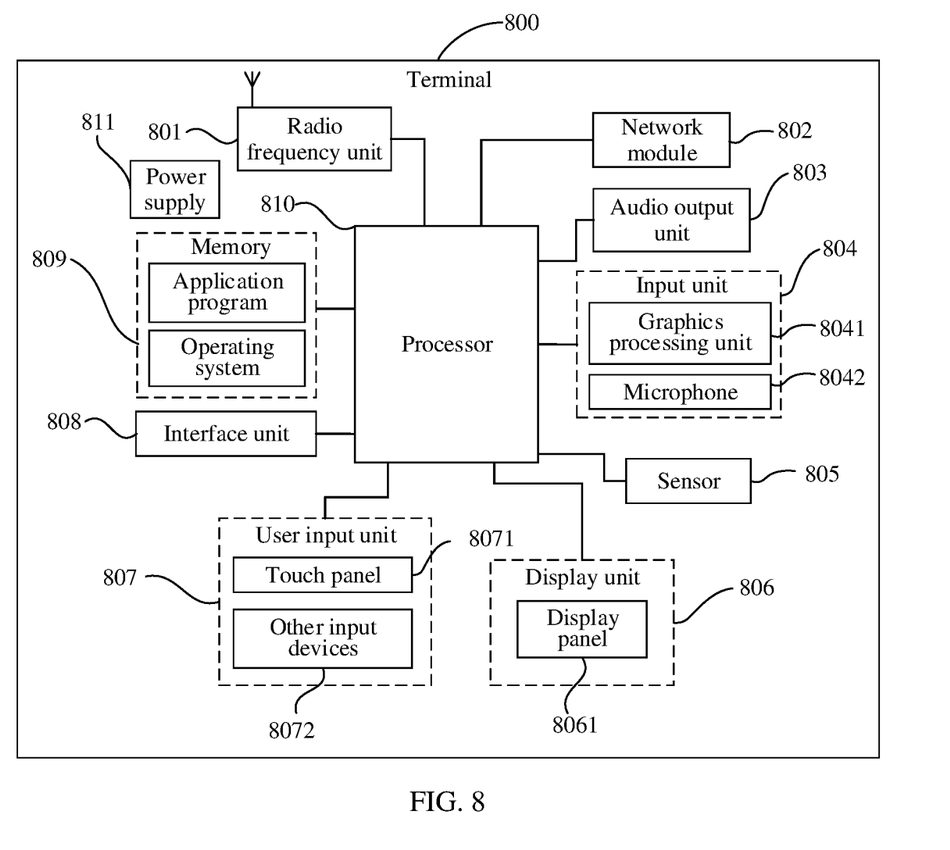
FIG. 8 is a structural diagram of another terminal according to an embodiment of this disclosure.

FIG. 8 is a schematic diagram of a hardware structure of a terminal for implementing the embodiments of this disclosure.

The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. Persons skilled in the art may understand that the terminal structure shown in FIG. 8 does not constitute a limitation on the terminal. The terminal may include more or fewer components than those shown in the figure, or combine some of the components, or have different arrangements of components. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 801 is configured to report assistance information to a network device, where the assistance information is used by a network to configure early measurement reporting for the terminal.

Optionally, the assistance information includes: information that no early measurement needs to be configured.

Optionally, the assistance information includes at least one of the following:

information that early measurement needs to be configured;
information about to-be-measured frequency channel;
information about validity timer; or
information about validity area.

Optionally, the information about validity area includes at least one of a tracking area, TA, list, a cell list, or a radio access network-based notification area list RNA list.

Optionally, the radio frequency unit 801 is further configured to receive an early measurement reporting configuration from the network.

Optionally, the early measurement reporting configuration is carried in dedicated signaling or a system broadcast message.

Optionally, the processor 810 is configured to determine the assistance information based on at least one of a terminal status, a carrier aggregation CA use history, or a dual connectivity DC use history.

Optionally, where the terminal status includes terminal battery information.

In this embodiment of this disclosure, the terminal reports the assistance information, so that the network device can configure the early measurement reporting for the terminal based on the assistance information. In this way, the terminal participates in the configuration of the early measurement reporting, thereby avoiding the problem of undesirable early measurement reporting caused by a mismatch between the early measurement reporting configured by the network and a requirement of the terminal.

It should be understood that in this embodiment of this disclosure, the radio frequency unit 801 may be configured to: receive and transmit a signal in an information receiving/transmitting process or a call process. Specifically, the radio frequency unit 801 receives downlink data from a base station, and transmits the downlink data to the processor 810 for processing; and transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and other devices via a wireless communications system.

The terminal provides wireless broadband Internet access for a user by using the network module 802, for example, helping the user transmit and receive e-mails, browse web pages, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, a call signal reception tone or a message reception tone) that is associated with a particular function performed by the terminal 800. The audio output unit 803 includes a speaker, a buzzer, a receiver, and the like.

The input unit 804 is configured to receive an audio or video signal. The input unit 804 may include a graphics processing unit (GPU) 8041 and a microphone 8042. The graphics processing unit 8041 processes image data of a still picture or a video obtained by an image capture apparatus (for example, a camera) in an image capture mode or a video capture mode. A processed image frame may be displayed on the display unit 806. An image frame processed by the graphics processing unit 8041 may be stored in the memory 809 (or another storage medium), or may be transmitted by the radio frequency unit 801 or the network module 802. The microphone 8042 is capable of receiving a sound and processing such sound into audio data. In a phone call mode, processed audio data may be converted into a format for transmission by the radio frequency unit 801 to a mobile communications base station, and output as such.

The terminal 800 further includes at least one sensor 805, for example, an optical sensor, a motion sensor, and other sensors. Specifically, the optical sensor may include an ambient light sensor and a proximity sensor. The ambient light sensor may adjust luminance of the display panel 8061 based on brightness of ambient light, and the proximity sensor may turn off the display panel 8061 and/or backlight when the terminal 800 moves close to an ear. As a motion sensor, an accelerometer sensor may detect magnitudes of accelerations in various directions (there are usually three axes), may detect the magnitude and direction of gravity when the terminal is still, and may be configured for terminal posture recognition (for example, landscape/portrait mode switching, related gaming, or magnetometer posture calibration), functions associated with vibration recognition (for example, pedometer or tapping), or the like. The sensor 805 may further include a fingerprint sensor, a pressure sensor, an iris sensor, a molecular sensor, a gyroscope, a barometer, a hygrometer, a thermometer, or an infrared sensor. Details are not described herein.

The display unit 806 is configured to display information input by the user or information provided to the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate key signal input associated with user settings and function control of the terminal. Specifically, the user input unit 807 includes a touch panel 8071 and other input devices 8072. The touch panel 8071 is also referred to as a touchscreen, and may collect a touch operation of the user on or near the touch panel 8071 (for example, an operation performed on or near the touch panel 8071 by the user by using any appropriate object or accessory such as a finger or a stylus). The touch panel 8071 may include two parts: a touch detection apparatus and a touch controller. The touch detection apparatus detects a touch orientation of the user, and detects a signal brought by the touch operation, and transmits the signal to the touch controller. The touch controller receives touch information from the touch detection apparatus, converts the touch information into touch point coordinates, transmits the touch point coordinates to the processor 810, and receives and executes a command transmitted by the processor 810. In addition, the touch panel 8071 may be implemented in a plurality of forms, for example, as a resistive, capacitive, infrared, or surface acoustic wave touch panel. In addition to the touch panel 8071, the user input unit 807 may further include other input devices 8072. Specifically, the other input devices 8072 may include but are not limited to a physical keyboard, a function key (for example, a volume control key or a power on/off key), a trackball, a mouse, and a joystick. Details are not described herein.

Further, the touch panel 8071 may cover the display panel 8061. When detecting a touch operation on or near the touch panel 8071, the touch panel 8071 transmits the touch operation to the processor 810 to determine a type of the touch event. Then, the processor 810 provides corresponding visual output on the display panel 8061 based on the type of the touch event. In FIG. 8, the touch panel 8071 and the display panel 8061 serve as two separate components to implement input and output functions of the terminal. However, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, an earphone port, or the like. The interface unit 808 may be configured to receive input (for example, data information and electric power) from the external apparatus, and transmit the received input to one or more elements in the terminal 800; or may be configured to transmit data between the terminal 800 and the external apparatus.

The memory 809 may be configured to store software programs and various data. The memory 809 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 809 may include a high-speed random access memory, and may further include a nonvolatile memory, for example, at least one magnetic disc storage device or a flash memory device, or other volatile solid-state storage devices.

The processor 810 is a control center of the terminal, and is connected to all components of the terminal by using various interfaces and lines. By running or executing software programs and/or modules that are stored in the memory 809 and calling data stored in the memory 809, the processor 810 executes various functions of the terminal and processes data, so as to perform overall monitoring on the terminal. The processor 810 may include one or more processing units. Optionally, the processor 810 may integrate an application processor and a modem processor. The application processor mainly processes an operating system, a user interface, an application program, and the like. The modem processor mainly processes wireless communication. It can be understood that the modem processor may alternatively not be integrated into the processor 810.

The terminal 800 may further include a power supply 811 (for example, a battery) that supplies power to the components. Optionally, the power supply 811 may be logically connected to the processor 810 by using a power management system, so as to implement functions such as charging management, discharging management, and power consumption management by using the power management system.

In addition, the terminal 800 includes some functional modules that are not shown. Details are not described herein.

Optionally, an embodiment of this disclosure further provides a terminal, including: a processor 810, a memory 809, and a computer program stored in the memory 809 and capable of running on the processor 810. When the computer program is executed by the processor 810, the processes in the foregoing embodiments of the reporting method are implemented, with the same technical effects achieved. To avoid repetition, details are not described herein again.

Figure 9:
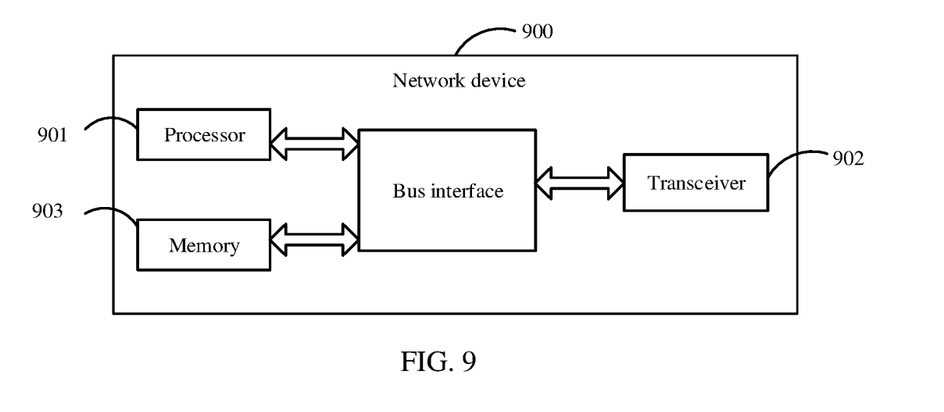
FIG. 9 is a structural diagram of another network device according to an embodiment of this disclosure.

Referring to FIG. 9, FIG. 9 is a structural diagram of another network device according to an embodiment of this disclosure. As shown in FIG. 9, the network device 900 includes a processor 901, a transceiver 902, a memory 903, and a bus interface.

The transceiver 902 is configured to obtain assistance information from a terminal, where the assistance information is used by a network to configure early measurement reporting for the terminal.

Optionally, the transceiver 902 is specifically configured to receive the obtaining assistance information from the terminal.

Optionally, the transceiver 902 is specifically configured to:

receive first context information from a source service network device of the terminal in a handover procedure of the terminal, where the first context information is context information of the terminal being in a connected state and includes the assistance information of the terminal; or receive second context information from a target network device, where the second context information is inactive-state context information and includes the assistance information of the terminal, and when receiving a context information obtaining request from the network device, the target network device transmits the second context information to the network device.

Optionally, the memory 903 is further configured to: when the obtained assistance information includes first assistance information and second assistance information, update the second assistance information to the first assistance information, where the first assistance information is assistance information reported by the terminal, and the second assistance information is assistance information in the first context information or assistance information in the second context information.

Optionally, the memory 903 is configured to store the assistance information reported by the terminal in context information of the terminal.

Optionally, the assistance information includes: information that no early measurement needs to be configured.

Optionally, the assistance information includes at least one of the following:

information that early measurement needs to be configured;

information about to-be-measured frequency channel;

information about validity timer; or information about validity area.

Optionally, the information about validity area includes at least one of a tracking area, TA, list, a cell list, or a radio access network-based notification area list RNA list.

Optionally, the transceiver 902 is further configured to transmit an early measurement reporting configuration to the terminal.

Optionally, the early measurement reporting configuration is carried in dedicated signaling or a system broadcast message.

In this embodiment of this disclosure, the terminal reports the assistance information, so that the network device can configure the early measurement reporting for the terminal based on the assistance information. In this way, the terminal participates in the configuration of the early measurement reporting, thereby avoiding the problem of undesirable early measurement reporting caused by a mismatch between the early measurement reporting configured by the network and a requirement of the terminal.

In FIG. 9, a bus architecture may include any number of interconnected buses and bridges, and specifically connects together circuits that are of one or more processors represented by the processor 901 and a memory represented by the memory 903. The bus architecture may further interconnect various other circuits such as a peripheral device, a voltage regulator, and a power management circuit. These are all common sense in the art, and therefore are not further described in this specification. The bus interface provides interfaces. The transceiver 902 may be a plurality of components, including a transmitter and a receiver, and provides units for communicating with a variety of other apparatuses on a transmission medium. For different user equipment, the user interface may also be an interface capable of externally or internally connecting a required device, and the connected device includes but is not limited to a keypad, a display, a speaker, a microphone, a joystick, and the like.

The processor 901 is responsible for management of the bus architecture and general processing, and the memory 903 may store data for use by the processor 901 when the processor 901 performs an operation.

Optionally, an embodiment of this disclosure further provides a network device, including: a processor 901, a memory 903, and a computer program that is stored in the memory 903 and capable of running on the processor 901. When the computer program is executed by the processor 901, the processes in the foregoing embodiments of the configuration method are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the embodiment of the reporting method on a terminal side provided in the embodiments of this disclosure are implemented, or when the computer program is executed by a processor, the processes of the embodiment of the configuration method on a network device side provided in the embodiments of this disclosure are implemented, with the same technical effect achieved. To avoid repetition, details are not described herein again. For example, the computer-readable storage medium is a read-only memory (ROM), a random access memory (RAM), a magnetic disk, or an optical disc.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software on a necessary universal hardware platform or by hardware only. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the methods described in the embodiments of this disclosure.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use a different method to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, and may be located in one position, or may be distributed on a plurality of network elements. Some or all of the units may be selected based on actual need to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of this disclosure essentially or the part contributing to the related art may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

Persons of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It can be understood that the embodiments described in the embodiments of this disclosure may be implemented by hardware, software, firmware, middleware, microcode, or a combination thereof. For hardware implementation, the module, unit, and subunit may be implemented in one or more application specific integrated circuits (ASICs), digital signal processors (DSPs), digital signal processing devices (DSPDs), programmable logic devices (PLDs), field-programmable gate arrays (FPGAs), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in or outside the processor.

The embodiments of this disclosure are described above with reference to the accompanying drawings, but this disclosure is not limited to these embodiments. These embodiments are only illustrative rather than restrictive. Inspired by this disclosure, persons of ordinary skill in the art can still derive a plurality of variations without departing from the essence of this disclosure and the protection scope of the claims. All these variations shall fall within the protection of this disclosure.

What is claimed is:

1. A reporting method, applied to a terminal, comprising:
    reporting assistance information to a network device, wherein the assistance information is used by the network to configure early measurement reporting for the terminal,
    the assistance information comprises information that no early measurement needs to be configured or the assistance information comprises information that early measurement needs to be configured,
    in a case that the assistance information comprises the information that early measurement needs to be configured, the assistance information further comprises at least one of following:
    information about to-be-measured frequency channel;
    information about early measurement timer; or
    information about early measurement area.

2. The method according to claim 1, wherein the information about early measurement area comprises at least one of a tracking area TA list, a cell list, or a radio access network-based notification area, RNA, list.

3. The method according to claim 1, wherein after the reporting assistance information to a network device, the method further comprises:
    receiving an early measurement reporting configuration from the network.

4. The method according to claim 3, wherein the early measurement reporting configuration is carried in dedicated signaling or a system broadcast message.

5. The method according to claim 1, wherein before the reporting assistance information to a network device, the method further comprises:
    determining the assistance information based on at least one of a terminal status, a carrier aggregation CA use history, or a dual connectivity DC use history.

6. The method according to claim 5, wherein the terminal status comprises terminal battery information.

7. A configuration method, applied to a network device, comprising:
    obtaining assistance information from a terminal, wherein the assistance information is used by the network to configure early measurement reporting for the terminal,
    the assistance information comprises information that no early measurement needs to be configured or the assistance information comprises information that early measurement needs to be configured,
    in a case that the assistance information comprises the information that early measurement needs to be configured, the assistance information further comprises at least one of following:
    information about to-be-measured frequency channel;
    information about early measurement timer; or
    information about early measurement area.

8. The method according to claim 7, wherein the obtaining assistance information from a terminal comprises:
    receiving the assistance information from the terminal.

9. The method according to claim 7, wherein the obtaining assistance information from a terminal comprises:
    receiving first context information from a source service network device of the terminal in a handover procedure of the terminal, wherein the first context information is context information of the terminal being in a connected state and comprises the assistance information of the terminal; or
    receiving second context information from a target network device, wherein the second context information is active-state context information and comprises the assistance information of the terminal, and when receiving a context information obtaining request from the network device, the target network device transmits the second context information to the network device.

10. The method according to claim 9, wherein when the obtained assistance information comprises first assistance information and second assistance information, the second assistance information is updated to the first assistance information, wherein
    the first assistance information is assistance information reported by the terminal, and the second assistance information is assistance information in the first context information or assistance information in the second context information.

11. The method according to claim 8, further comprising:
    storing the assistance information reported by the terminal in context information of the terminal.

12. The method according to claim 7, wherein before the obtaining assistance information from a terminal, the method further comprises:
    transmitting an early measurement reporting configuration to the terminal.

13. A terminal, comprising a memory, a processor, and a program stored in the memory and capable of running on the processor, wherein when the program is executed by the processor, a following step is implemented:
    reporting assistance information to a network device, wherein the assistance information is used by the network to configure early measurement reporting for the terminal,
    the assistance information comprises information that no early measurement needs to be configured or the assistance information comprises information that early measurement needs to be configured, in a case that the assistance information comprises the information that early measurement needs to be configured, the assistance information further comprises at least one of following:

information about to-be-measured frequency channel;
information about early measurement timer; or
information about early measurement area.

14. The terminal according to claim 13, wherein the information about validity area comprises at least one of a tracking area TA list, a cell list, or a radio access network-based notification area, RNA, list.

\* \* \* \* \*